(12) United States Patent
Tomomatsu et al.

(10) Patent No.: US 8,956,262 B2
(45) Date of Patent: Feb. 17, 2015

(54) CONTINUOUSLY VARIABLE TRANSMISSION

(75) Inventors: Daisuke Tomomatsu, Susono (JP); Akira Murakami, Gotenba (JP); Hiroyuki Ogawa, Susono (JP); Yuki Aratsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/574,083

(22) PCT Filed: Sep. 22, 2011

(86) PCT No.: PCT/JP2011/071714
§ 371 (c)(1),
(2), (4) Date: Jul. 19, 2012

(87) PCT Pub. No.: WO2013/042263
PCT Pub. Date: Mar. 28, 2013

(65) Prior Publication Data
US 2014/0235401 A1    Aug. 21, 2014

(51) Int. Cl.
*F16H 15/52* (2006.01)
*F16H 15/40* (2006.01)

(52) U.S. Cl.
CPC ............. *F16H 15/40* (2013.01); *F16H 15/52* (2013.01)
USPC ............................................. 476/38; 476/50

(58) Field of Classification Search
USPC ............................................. 476/36, 38, 50
See application file for complete search history.

(56) References Cited

U.S. PATENT DOCUMENTS

| 2006/0084549 | A1 | 4/2006 | Smithson et al. |
| 2007/0155567 | A1* | 7/2007 | Miller et al. .................... 475/37 |
| 2009/0221391 | A1* | 9/2009 | Bazyn et al. .................. 475/159 |
| 2010/0173743 | A1 | 7/2010 | Nichols et al. |

FOREIGN PATENT DOCUMENTS

| JP | B1-47-20535 | 6/1972 |
| JP | A-6-272745 | 9/1994 |
| JP | A-2008-516165 | 5/2008 |

OTHER PUBLICATIONS

International Search Report issued in International Patent Application No. PCT/JP2011/071747 dated Dec. 6, 2011 (with translation).

* cited by examiner

*Primary Examiner* — William C Joyce
(74) *Attorney, Agent, or Firm* — Oliff PLC

(57) ABSTRACT

A continuously variable transmission includes plural planetary balls, a carrier, a sun roller, an input shaft, an output shaft, and thrust bearings sandwiched between respective holding surfaces of the input shaft and the output shaft, wherein the holding surface at a time of rest is formed such that a space between the holding surface and a race on one side of the thrust bearing becomes wider on an outside in a radial direction than on an inside in the radial direction, and the holding surface at the time of rest is formed such that a space between the holding surface and a race on the other side of the thrust bearing becomes wider on the outside in the radial direction than on the inside in the radial direction.

1 Claim, 9 Drawing Sheets

FIG.5
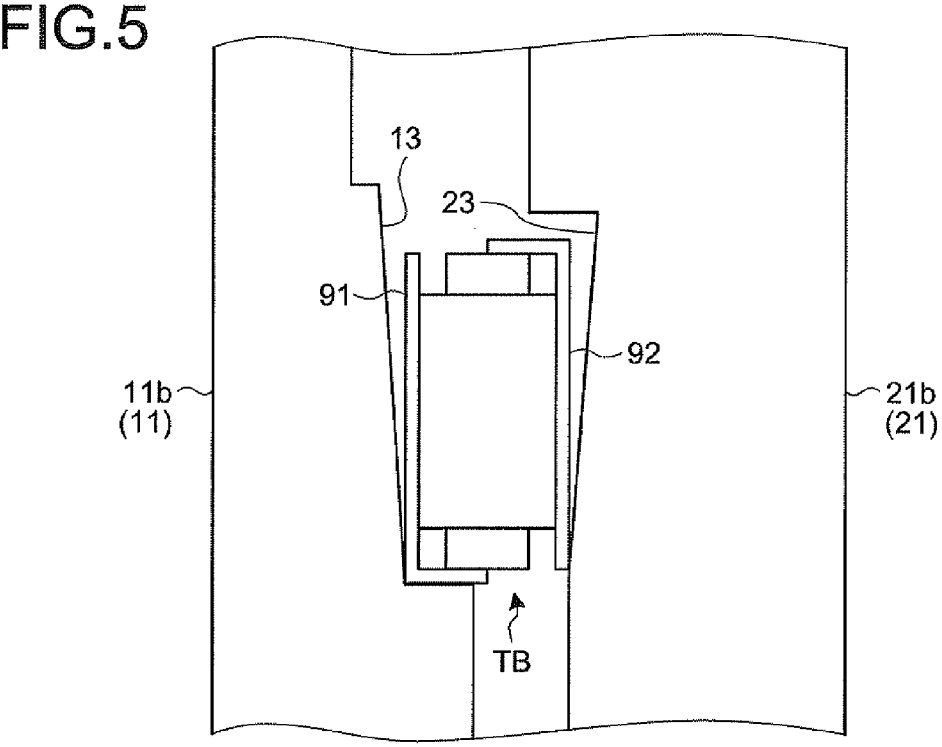
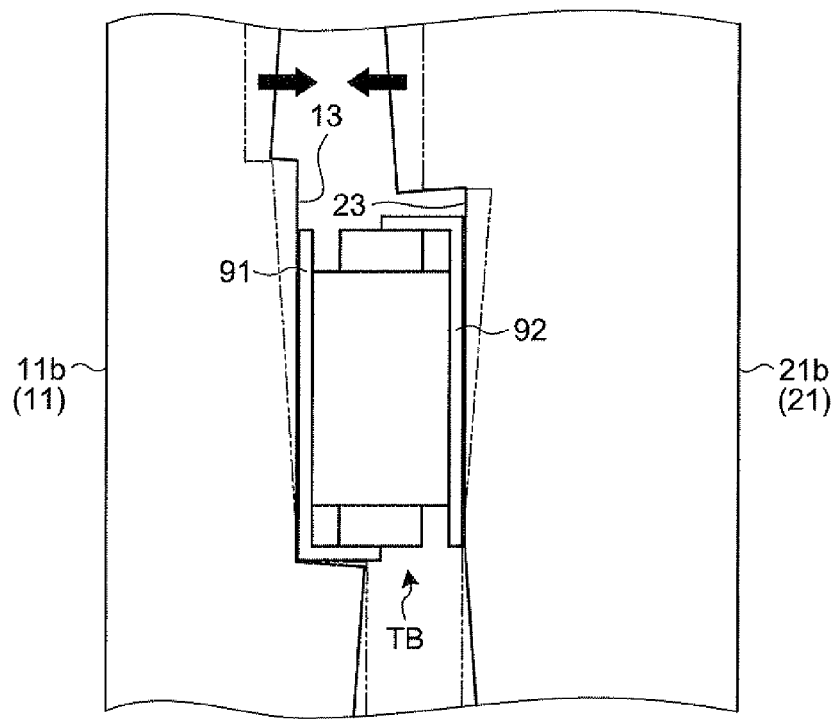
INCREASE OF PRESSURE FORCE

CONTINUOUSLY VARIABLE TRANSMISSION

FIELD

The present invention relates to a continuously variable transmission having plural rotating elements having a common rotation axis and plural rolling member disposed radially with respect to the rotation axis and continuously variably changing a transmission ratio between an input and an output by tilting respective rolling members sandwiched between two of the respective rotating elements.

BACKGROUND

Conventionally, there is known a so-called traction planetary gear mechanism as this type of the continuously variable transmission. The traction planetary gear mechanism has a transmission shaft acting as a center of rotation, plural rotating elements capable of relatively rotating using a central axis of the transmission shaft as a first rotation central axis, and second rotation central axes separate from and parallel with the first rotation central axis and includes plural rolling members radially disposed about the first rotation central axis, support shafts for causing the rolling members to rotate on their axes as well as supporting the rolling members, and a fixed element fixed to the transmission shaft and holding the rolling members via respective projecting sections from the rolling members in the support shafts. In the traction planetary gear mechanism, the respective rolling members are between the first rotating element and the second rotating element disposed in confrontation with each other as well as the respective rolling members are disposed on an outer circumferential surface of a third rotating element, and a transmission ratio is continuously variably changed by tilting the rolling members.

For example, Patent Literature 1 described below discloses this type of a continuously variable transmission. In the continuously variable transmission, an input shaft of torque (power) is coupled with any one of first and second ring members as the first and second rotating elements, and an output shaft of torque is coupled with the other thereof. Then, the input shaft and the output shaft are disposed so as to relatively rotate about a first rotation central axis via a bearing disposed between the input shaft and the output shaft. The input shaft and the output shaft have disk sections confronting with each other. The disk section of the input shaft is thinner than the disk section of the output shaft. For example, the input shaft and the output shaft relatively rotate via a roller bearing disposed on an outside diameter side between the respective disk sections and a ball bearing disposed on an inside diameter side between the respective disk sections. The roller bearing is disposed for a purpose of reducing drag torque and abuts respective races to plane portions of the respective disk sections disposed in parallel with each other.

This type of the continuously variable transmission is disclosed also in Patent Literature 2 described below. The continuously variable transmission of Patent Literature 2 also includes an input shaft and an output shaft, and a roller bearing on an outside diameter side and a ball bearing on an inside diameter side (inner circumferential surface side) are disposed between respective disk sections likewise Patent Literature 1. Note that, also in the continuously variable transmission of Patent Literature 2, although respective races of the roller bearing are abutted to plane portions of respective disk sections disposed in parallel with each other, an inside diameter side of the disk section of the output shaft is tilted more than the roller bearing.

CITATION LIST

Patent Literatures

Patent Literature 1: Japanese Patent Application National Publication No. 2008-516165
Patent Literature 2: Specification of U.S. Patent Application Publication No. 2010/0173743

SUMMARY

Technical Problem

Incidentally, in the continuously variable transmission, a pressure force is generated to push the first and second rotating elements to the rolling members. For example, the pressure force is generated by a pressure force generating device such as a torque cam and the like disposed between the first rotating element and the input shaft and between the second rotating element and the output shaft. Accordingly, since a reaction force of the pressure force acts on the input shaft and the output shaft, there is a possibility that a flexure is generated to the respective disk sections. Then, since the flexure of the respective disk sections applies a pressure force also to the bearings sandwiched between the respective disk sections, there is a possibility that a drive loss of the bearings is increased and durability thereof is deteriorated. In particular, the flexure of the disk sections, the increase of the drive loss, and the like become more outstanding as the pressure force generated by the pressure force generating device more increases. The flexure of the disk sections is reduced by increasing a wall thickness thereof. However, since an increase of wall thickness of the disk sections increases a length of the continuously variable transmission in an axial direction and further increases a body size thereof and thus a weight thereof is more increased, this is not useful as a means for suppressing the increase of the drive loss of the bearings and the like.

Thus, an object of the present invention is to improve the disadvantages of the conventional examples and to provide a continuously variable transmission capable of improving a drive efficiency and durability of bearings between an input shaft and an output shaft.

Solution to Problem

In order to achieve the above mentioned object, a continuously variable transmission according to the present invention includes a transmission shaft acting as a center of rotation; first and second rotating elements that are disposed on the transmission shaft in confrontation with each other, have a common first rotation central axis, and are capable of relatively rotating with each other; a plurality of rolling members that have a second rotation central axes in parallel with the first rotation central axis, are disposed radially about the first rotation central axis, and are sandwiched between the first and second rotating elements; support shafts of the rolling members that have the second rotation central axes and project both ends from the rolling members; a holding member that tiltably hold the rolling members via the respective projecting sections of the support shafts; a third rotating element that disposes the respective rolling members on an outer circumferential surface and is capable of relatively rotating with respect to the transmission shaft as well as the first and second rotating elements; a speed change device that changes a transmission ratio by changing a rotation ratio between the first rotating element and the second rotating element by a tilt operation of the respective rolling members; an input shaft of torque that has a disk section rotating about the first rotation central axis as well as is coupled with the first rotating element, and is subjected to a reaction force of a pressure force directed from the first rotating element to the respective rolling members; an output shaft of torque that has a disk section rotating about the first rotation central axis and arranged opposite to the disk section of the input shaft as well as is coupled with the second rotating element, and is subjected to a reaction force of a pressure force directed from the second rotating element to the respective rolling members; and a bearing sandwiched between a holding surface in the disk section of the input shaft and a holding surface in the disk section of the output shaft, wherein the holding surface of the input shaft at a time of rest is formed such that a space between the holding surface and a race on one side of the bearing becomes wider on an outside in the radial direction than on an inside in the radial direction, and the holding surface of the output shaft at the time of rest is formed such that a space between the holding surface and a race on the other side of the bearing becomes wider on the outside in the radial direction than on the inside in the radial direction.

Here, it is desirable that an elastic member on the input shaft side that applies a load to an outside portion of the race on one side of the bearing in the radial direction between the holding surface of the input shaft and the race at the time of rest is disposed as well as an elastic member on the output shaft side that applies a load to an outside portion of the race on the other side of bearing in the radial direction between the holding surface of the output shaft and the race at the time of rest is disposed.

Advantageous Effects of Invention

In the continuously variable transmission according to the present invention, when the reaction force of the pressure force acts on the input shaft and the output shaft and the respective disk sections are flexed, the outside portions of the respective holding surfaces in the radial direction become nearer to the outside portions of the respective races in the radial direction as the pressure force increases. That is, in the continuously variable transmission, even if the pressure force increases, no excessive load is applied from the respective holding surfaces to the races. Thus, according to the continuously variable transmission, since the increase of the drive loss of the bearings and the deterioration of the durability thereof can be suppressed, a fuel consumption and the durability can be improved. Further, according to the continuously variable transmission, the flexure of the disk sections can be allowed, the thickness of the disk sections can be thinned and the increase of shaft length and the increase of weight of the continuously variable transmission can be suppressed.

BRIEF DESCRIPTION OF DRAWINGS

FIG. 5 is a view explaining a shape of a holding surface of a thrust bearing and an action to the bearing.

DESCRIPTION OF EMBODIMENTS

An embodiment of a continuously variable transmission according to the present invention will be explained below in detail based on the drawings. Note that the present invention is not restricted by the embodiment.

Embodiment

An embodiment of the continuously variable transmission according to the present invention will be explained based on FIG. 1 to FIG. 11.

Figure 1:
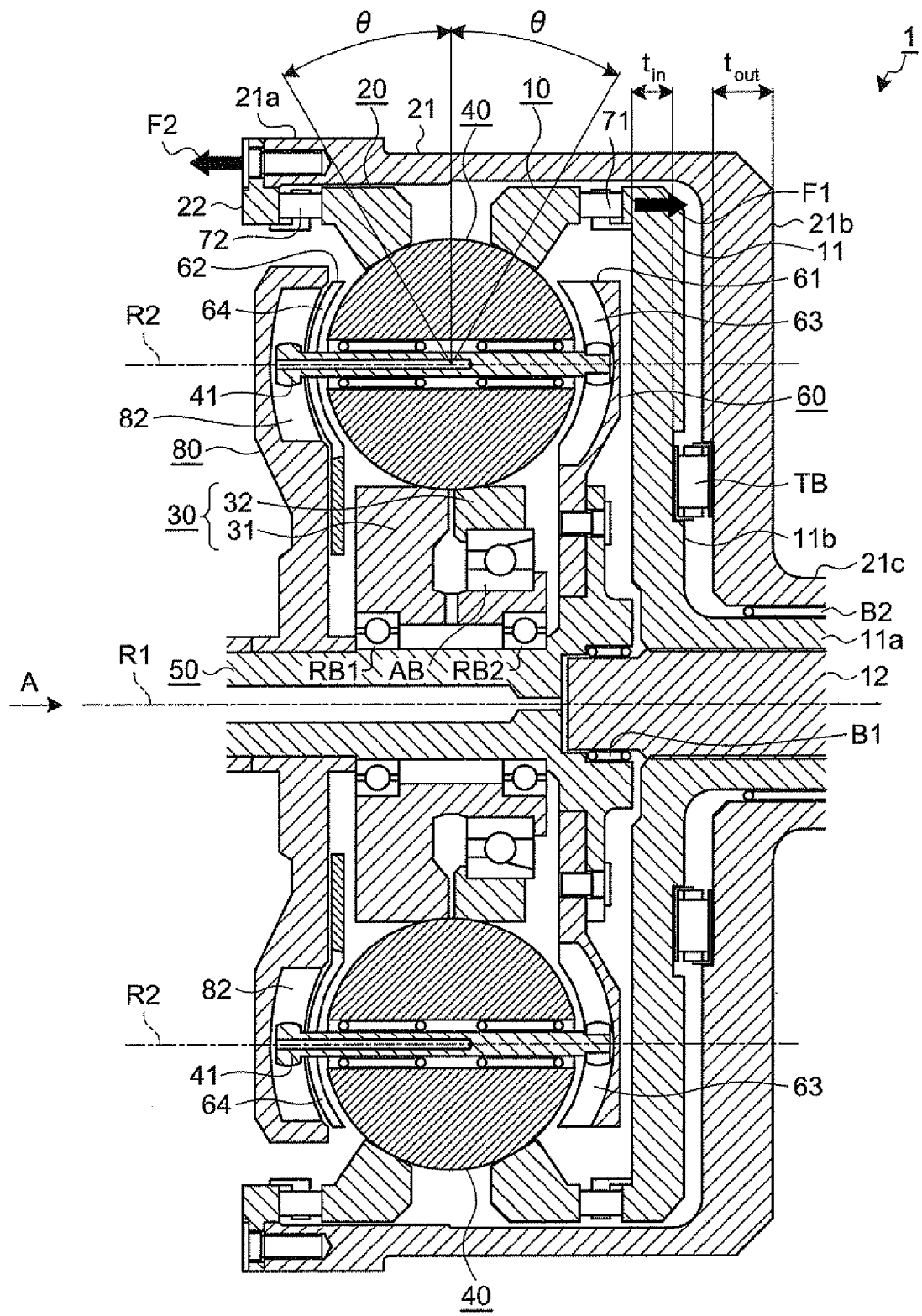
FIG. 1 is a partial sectional view showing a configuration of an embodiment of a continuously variable transmission according to the present invention.

First, an example of the continuously variable transmission of the embodiment will be explained using FIG. 1. Reference numeral 1 of FIG. 1 shows a continuously variable transmission of the embodiment.

A continuously variable transmission mechanism that constitutes a main portion of the continuously variable transmission 1 is said to be a so-called traction planetary gear mechanism that includes first to third rotating elements 10, 20, 30 having a common first rotation central axis R1 and can be relatively rotated therebetween, plural rolling members 40 that are disposed radially about the first rotation central axis R1 and have second rotation central axes R2 separate from and in parallel with the first rotation central axis R1 at a reference position to be described later, respectively, a shaft 50 as a transmission shaft disposed at a center of rotation of the first to third rotating elements 10, 20, 30, and a holding member 60 for tiltably holding the respective rolling members 40. The continuously variable transmission 1 changes a transmission ratio γ between an input and an output by tilting the second rotation central axes R2 to the first rotation central axis R1 and tilting the rolling members 40. In the following description, unless otherwise described, a direction along the first rotation central axis R1 and the second rotation central axes R2 is called an axial direction and a circumferential direction of the first rotation central axis R1 is called a circumferential direction. Further, a direction orthogonal to the first rotation central axis R1 is called a radial direction, and a side facing inside in the radial direction is called a radial direction inside and a direction facing outside is called a radial direction outside.

In the continuously variable transmission 1, the respective rolling members 40 are sandwiched between the first rotating element 10 and the second rotating element 20 that are disposed in confrontation with each other as well as the respective rolling members 40 are disposed on an outer circumferential surface of the third rotating element 30, and torque is transmitted between the first rotating element 10 and the second rotating element 20 and the third rotating element 30 via the respective rolling members 40. In the continuously variable transmission 1, any one of the first and second rotating elements 10, 20 is used as an input unit of torque (power), and the other thereof is used as an output unit of torque. Accordingly, in the continuously variable transmission 1, a ratio of rotation speeds (number of rotations) between any rotating element acting as the input unit and any rotating element acting as the output unit becomes a transmission ratio γ. For example, the continuously variable transmission 1 is disposed on a power transmission path of a vehicle. At the time, the input unit is coupled with a power source side of an engine and a motor, and the like, and the output unit is coupled with a drive wheel side. In the continuously variable transmission 1, a rotation operation of the respective rotating elements when torque is input to the rotating element as the input unit is called a forward drive, and a rotation operation of the respective rotating elements when torque in a direction reverse to the time of forward drive is input to the rotating element as the output shaft is called a reverse drive. For example, according to the vehicle described previously, when torque is input from the power source side to the rotating element as the input unit as in an acceleration and the like and the rotating element is rotated, the continuously variable transmission 1 executes the forward drive, and when torque in a direction reverse to the time of forward drive is input from the drive wheel side to the rotating element in rotation as the output unit as in a deceleration and the like, the continuously variable transmission 1 executes the reverse drive.

The continuously variable transmission 1 generates an appropriate tangential force (traction force) between the first to third rotating elements 10, 20, 30 and the rolling members 40 and facilitates torque to be transmitted therebetween by pushing at least one of the first and second rotating elements 10, 20 to the rolling members 40. Further, the continuously variable transmission 1 changes a ratio of rotation speeds (the number of rotations) between an input and an output by tilting the respective rolling members 40 on a tilted plane including the second rotation central axes R2 of themselves and the first rotation central axis R1 and changing a ratio of rotation speeds (the number of rotations) between the first rotating element 10 and the second rotating element 20.

Here, in the continuously variable transmission 1, the first and second rotating elements 10, 20 achieve a function of ring gears in a traction planetary gear mechanism. Further, the third rotating element 30 functions as a sun roller of the traction planetary gear mechanism. Further, the rolling members 40 function as ball type pinions in the traction planetary gear mechanism, and the holding member 60 functions as a carrier. Hereinafter, the first and second rotating elements 10, 20 are called "first and second rotating members 10, 20", respectively. Further, the third rotating element 30 is called "a sun roller 30", and the rolling members 40 are called "planetary balls 40". Further, the holding member 60 is called "a carrier 60". In the following example, the carrier 60 is used as a fixed element and fixed to the shaft 50.

The shaft 50 is fixed to a fixed portion of the continuously variable transmission 1 in a case, a vehicle body, and the like which are not shown and is a cylindrical fixed shaft configured not to relatively rotate to the fixed portion. In the shaft 50, its inside space is used as an oil path of a lubricating oil.

The first and second rotating members 10, 20 are disk members (disks) and annular members (rings) whose axes are caused to agree with the first rotation central axis R1 and disposed so as to sandwich the respective planetary balls 40 while causing them in confrontation with each other in the axial direction. In the example, both the first and second rotating members 10, 20 are composed of annular members.

The first and second rotating members 10, 20 have contact surfaces that come into contact with outer circumferential curved surfaces of the planetary balls 40 on the outsides thereof in the radial direction which will be described later in detail. The respective contact surfaces of the first and second rotating members 10, 20 are formed in, for example, shapes of a concave arc surface having the same curvature as a curvature of an outer circumferential curved surface of the planetary balls 40, a concave arc surface having a curvature different from the curvature of the outer circumferential curved surface of the planetary balls 40, a convex arc surface or a plane surface, and the like. Here, the respective contact surfaces are formed so that distances from the first rotation central axis R1 to contact points with the respective planetary balls 40 become the same length in a state of the reference position to be described later in order that the first and second rotating members 10, 20 have the same contact angle θ to the respective planetary balls 40. The contact angle θ is an angle from a reference to the contact points with the respective planetary balls 40. Here, the radial direction is used as the reference. The respective contact surfaces are in point contact or in surface contact with the outer circumferential curved surfaces of the planetary balls 40. Further, the respective contact surfaces are formed such that when a force (pressure force) in the axial direction is applied from the first and second rotating members 10, 20 to the planetary balls 40, a force (normal force) is applied to the planetary balls 40 internally of the radial direction as well as in an oblique direction.

In the example, the first rotating member 10 is caused to act as a torque input unit when the continuously variable transmission 1 is driven forward, and the second rotating member 20 is caused to act as a torque output unit when the continuously variable transmission 1 is driven forward. Accordingly, the first rotating member 10 is coupled with an input shaft (first rotating shaft) 11 and the second rotating member 20 is coupled with an output shaft (second rotating shaft) 21. The input shaft 11 and the output shaft 21 can relatively rotate in a circumferential direction with respect to the shaft 50. Further, the input shaft 11 and the output shaft 21 can relatively rotate in the circumferential direction also therebetween.

The input shaft 11 has a cylindrical section 11a and a disk section 11b and disposed on the first rotating member 10 side as a torque input unit when observed from the continuously variable transmission in its entirety. The input shaft 11 may be integrally molded so as to include the cylindrical section 11a and the disk section 11b or may connect the cylindrical section 11a and the disk section 11b by a fixing member such as a bolt and the like.

The cylindrical section 11a covers a cylindrical or columnar rotating shaft 12 from an outside in the radial direction as well as is formed in a cylindrical shape fixed to the rotating shaft 12 with its central axis in agreement with the first rotation central axis R1. In the example, a spline bearing is formed between an inner circumferential surface of the cylindrical section 11a and an outer circumferential surface of the rotating shaft 12 and the cylindrical section 11a is fixed to the rotating shaft 12 by a spline engagement. The rotating shaft 12 is an input rotating shaft concentrically disposed to an end of the shaft 50 and can relatively rotate in a circumferential direction with respect to the shaft 50 via a bearing (for example, a roller bearing, a needle bearing, and the like) B1. Accordingly, the exemplified input shaft 11 relatively rotates in the circumferential direction with respect to the shaft 50 via the rotating shaft 12 to which the cylindrical section 11a is fixed and the bearing B1.

The disk section 11b is formed in a disk shape extending from an end of the cylindrical section 11a to an outside in the radial direction with its central axis in agreement with the first rotation central axis R1. The disk section 11b is molded so that its outside diameter becomes approximately the same size as an outside diameter of the first rotating member 10.

An axis force generating section 71 that generates an axis force is disposed between the input shaft 11 and the first rotating member 10. The axis force is a pressure force that pushes the first rotating member 10 to the respective planetary balls 40. The axis force generating section 71 is disposed between an outside diameter side of the disk section 11b in the input shaft 11 and the first rotating member 10. Here, a torque cam is used as the axis force generating section 71. Accordingly, the axis force generating section 71 generates the axis force between the input shaft 11 and the first rotating member 10 as well as transmits rotation torque and rotates them integrally by that an engaging member on the input shaft 11 side is engaged with an engaging member on the first rotating member 10 side. A reaction force generated by the axis force acts on the input shaft 11 in a direction of an arrow F1 of FIG. 1.

The output shaft 21 has a first cylindrical section 21a and a disk section 21b and a second cylindrical section 21c. The output shaft 21 may be integrally molded so as to include the first cylindrical section 21a and the disk section 21b and the second cylindrical section 21c or may connect the first cylindrical section 21a and the disk section 21b and the second cylindrical section 21c by a fixing member such as a bolt and the like.

The first cylindrical section 21a is formed in a cylindrical shape so as to cover the first and second rotating members 10, 20 from an outside in the radial direction with its central axis in agreement with the first rotation central axis R1. Further, the first cylindrical section 21a is extended in the axial direction so as to cover also the axis force generating section 71 and the disk section 11b of the input shaft 11 from the outside in the radial direction.

The disk section 21b is formed in a disk shape extending from an extending end of the first cylindrical section 21a to an inside in the radial direction as well as to an outer circumferential surface of the cylindrical section 11a of the input shaft 11 with its central axis in agreement with the first rotation central axis R1. That is, the disk section 21b is disposed in confrontation with the disk section 11b of the input shaft 11.

The second cylindrical section 21c is formed in a cylindrical shape so as to cover the cylindrical section 11a of the input shaft 11 from an outside in the radial direction and is extended in the axial direction from an inside diameter side of the disk section 21b with its central axis in agreement with the first rotation central axis R1.

In the continuously variable transmission 1, a bearing (for example, a roller bearing and a needle bearing and the like) B2 is disposed between an inner circumferential surface of the second cylindrical section 21c and an outer circumferential surface of the cylindrical section 11a. Further, a thrust bearing (here, a thrust roller bearing, a thrust needle bearing, a thrust ball bearing, and the like) TB is disposed between the respective disk sections 11b, 21b of the input shaft 11 and the output shaft 21. Accordingly, the output shaft 21 can relatively rotate with respect to the input shaft 11 via the bearing B2 and the thrust bearing TB.

An axis force generating section 72 that generates a pressure force (axis force) for pushing the second rotating member 20 to the respective planetary balls 40 is disposed between the output shaft 21 and the second rotating member 20. A torque cam similar to the axis force generating section 71 is used for the axis force generating section 72. In the example, the output shaft 21 is coupled with the axis force generating section 72 via an annular member 22. The annular member 22 is connected to the other end (the end on a reverse side of the extending end) of the first cylindrical section 21a of the output shaft 21 by, for example, a fixing member such as a bolt and the like. The annular member 22 is extended inside of the first cylindrical section 21a in the radial direction. The axis force generating section 72 is disposed between an inside diameter side of the extended annular member 22 and the second rotating member 20. The axis force generating section 72 generates an axis force between the annular member 22 and the second rotating member 20 as well as transmits rotation torque and rotates them integrally by that an engaging member on the annular member 22 side is engaged with an engaging member on the second rotating member 20 side. Accordingly, a reaction force generated by the axis force acts on the output shaft 21 in a direction of an arrow F2 of FIG. 1. Further, the output shaft 21 can transmit rotation torque between the second rotating member 20 and can rotate integrally with the second rotating member 20.

Note that, in the continuously variable transmission 1, it is also possible to use the first rotating member 10 as the torque output unit as well as to use the second rotating member 20 as the torque input unit, and, in the case, the shaft disposed as the input shaft 11 is used as the output shaft and the shaft disposed as the output shaft 21 is used as the input shaft.

The sun roller 30 is concentrically disposed with the shaft 50 and is relatively rotated in the circumferential direction with respect to the shaft 50. The plural planetary balls 40 are radially disposed on an outer circumferential surface of the sun roller 30 at approximately equal intervals. Accordingly, in the sun roller 30, the outer circumferential surface acts as a rolling surface when the planetary balls 40 rotate on their axes. The sun roller 30 can cause the planetary balls 40 to roll (to rotate on their axes) by its rotation operation and can be rotated by the rolling operations (rotated on their axes) of the respective planetary balls 40.

In the example, the sun roller 30 is made to a two-divided structure of a first divided structural member 31 and a second divided structural member 32 and each of the first divided structural member 31 and the second divided structural member 32 has contact points with the respective planetary balls 40. This is because, since a spin loss can be reduced by reducing a surface pressure by dispersing a contact force between the sun roller 30 and the planetary balls 40, a reduction of a power transmission efficiency can be reduced as well as the durability can be improved. The respective contact points exist at positions which have the same distance from the centers of gravity of the respective planetary balls 40 and have also the same distance from the first rotation central axis R1.

The first divided structural member 31 is attached to the shaft 50 via radial bearings RB1, RB2 and can relatively rotate in and circumferential direction with respect to the shaft 50. For example, the first divided structural member 31 may be composed of an integrally molded member, may be a member integrated by connecting plural members by a fixing member such as a bolt and a pin, and the like or may be a member made by integrating plural members by press fit and caulking. An outside diameter of the first divided structural member 31 on one side is made larger than an outside diameter thereof on the other side across a plane including the centers of the respective planetary balls 40. The first divided structural member 31 has contact points on one side with the respective planetary balls 40 on an outer circumferential surface on the one side having the large outside diameter. Further, the second divided structural member 32, which has the contact points on the other side with the respective planetary balls 40, is disposed on an outer circumferential surface on the other side having a small diameter in the first divided structural member 31 via, for example, an angular bearing AB. With the configuration, in the continuously variable transmission 1, the first divided structural member 31 and the second divided structural member 32 can relatively rotate with each other in the circumferential direction as well as since a loss energy between the sun roller 30 and the planetary balls 40 becomes small by that the angular bearing AB absorbs a thrust load, the reduction of the power transmission efficiency can be suppressed.

The planetary balls 40 are rolling members that roll on the outer circumferential surface of the sun roller 30. Although the planetary balls 40 are preferably perfectly spherical bodies, they may be bodies formed in a spherical shape in at least a rolling direction, for example, may be bodies having an oval cross section such as a rugby ball. The planetary balls 40 are rotatably supported by support shafts 41 that are caused to pass through their centers. For example, the planetary balls 40 can relatively rotate (that is, can rotate on their axes) with respect to the support shafts 41 using the second rotation central axes R2 as rotating axes by bearings disposed between the planetary balls 40 and outer circumferential surfaces of the support shafts 41. The planetary balls 40 can roll on the outer circumferential surface of the sun roller 30 about the support shafts 41. Both the ends of the support shafts 41 are caused to project from the planetary balls 40.

As shown in FIG. 1, positions that act as references of the support shafts 41 are positions where the second rotation central axes R2 are in parallel with the first rotation central axis R1. The support shafts 41 can swing (tilt) together with the planetary balls 40 in a tilted plane including rotation central axes of themselves formed at the reference positions (the second rotation central axes R2) and the first rotation central axis R1 between the reference positions and positions tilted therefrom. The tilt is executed in the tilted plane using the centers of the planetary balls 40 as fulcrums.

The carrier 60 holds the respective projecting sections of the support shafts 41 so as not to disturb the tilt operations of the respective planetary balls 40. The carrier 60 has, for example, first and second disk sections 61, 62 having central axes in agreement with the first rotation central axis R1. The first and second disk sections 61, 62 are disposed in confrontation with each other with a space defined therebetween so that the sun roller 30 and the planetary balls 40 can be disposed therebetween. An inside diameter side of at least one of the first and second disk sections 61, 62 is fixed to an outside diameter side of the shaft 50 so that the carrier 60 cannot execute a relative rotation in the circumferential direction and a relative movement in the axial line direction with respect to the shaft 50. Here, the first disk section 61 is fixed to the shaft 50 as well as the first disk section 61 is joined to the second disk section 62 by not shown plural support shafts, and the carrier 60 is formed in a basket shape.

Figure 2:
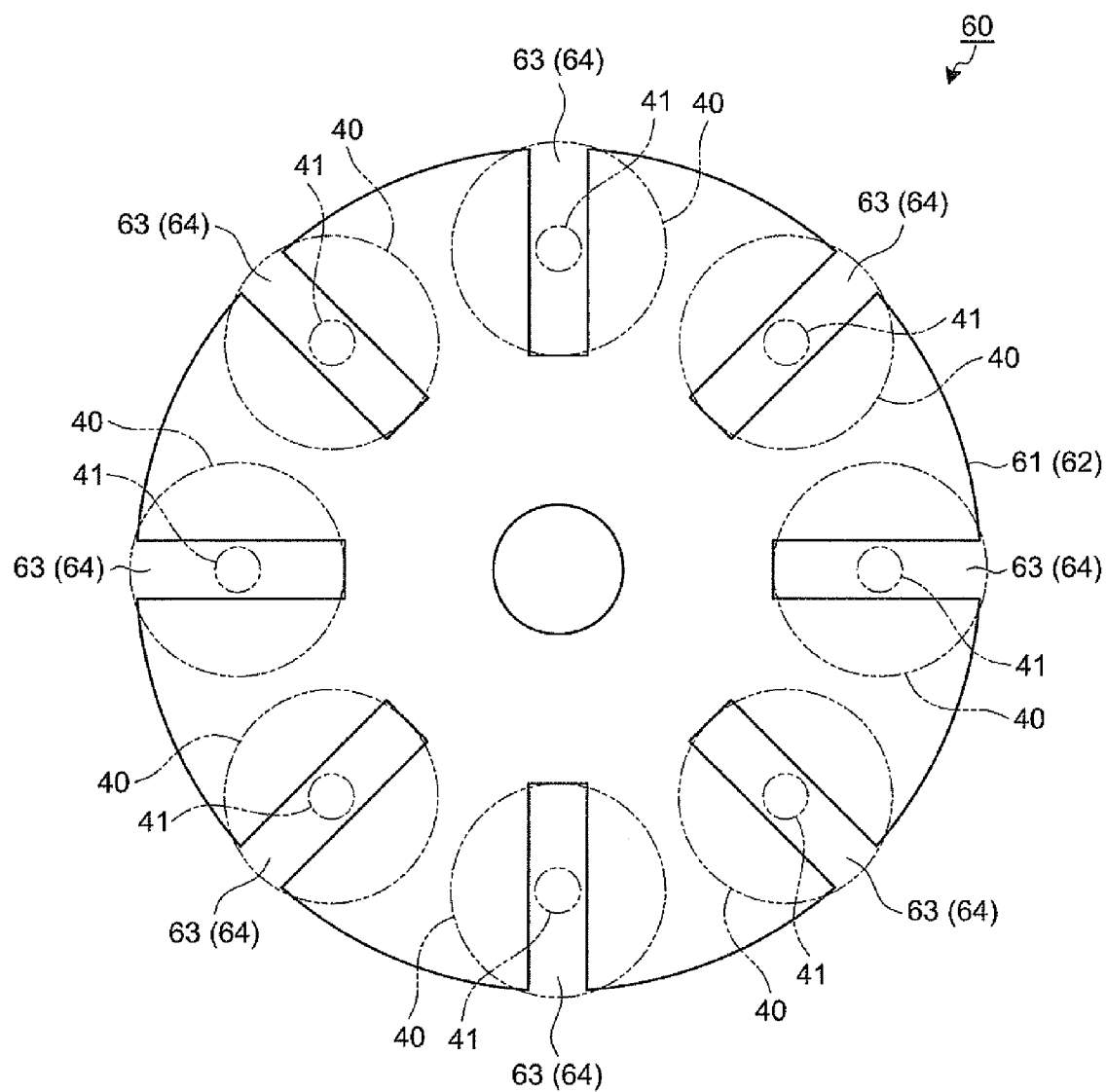
FIG. 2 is a view explaining a guide section of a support shaft in a carrier.

The continuously variable transmission 1 is disposed with guide sections 63, 64 that guide the support shafts 41 in a tilt direction when the respective planetary balls 40 are tilted. In the example, the guide sections 63, 64 are disposed to the carrier 60. The guide sections 63, 64 are guide grooves and guide holes in the radial direction for guiding the support shafts 41 which are projected from the planetary balls 40 and formed to each of the planetary balls 40 in the portions with which the first and second disk sections 61, 62 confront, respectively (FIG. 2). That is, when observed from the axial direction (for example, a direction of an arrow A of FIG. 1), all the guide sections 63, 64 are formed radially, respectively.

In the continuously variable transmission 1, when the tilt angles of the respective planetary balls 40 are at the reference positions, that is, 0°, the first rotating member 10 and the second rotating member 20 rotate at the same rotation speed (the same number of revolutions). That is, at the time, a rotation ratio (ratio of rotation speeds or a number of revolutions) of the first rotating member 10 and the second rotating member 20 becomes 1 and the transmission ratio $\gamma$ becomes 1. In contrast, when the respective planetary balls 40 are tilted from the reference positions, the distances from the central axes (the second rotation central axes R2) of the support shafts 41 to the contact points with the first rotating member 10 change as well as the distances from the central axes of the support shafts 41 to the contact points with the second rotating member 20 change. Accordingly, any one of the first rotating members 10 or the second rotating members 20 rotates at a speed higher than the time at which it is at the reference position, and the other thereof rotates at a low speed. When, for example, the planetary balls 40 are tilted to one side, the second rotating member 20 rotates at a speed lower than the first rotating member 10 (speed reduction), whereas when the planetary balls 40 are tilted on the other side, the second rotating member 20 rotates at a speed higher than the first rotating member 10 (speed increase). Accordingly, in the continuously variable transmission 1, the rotation ratio (transmission ratio $\gamma$) between the first rotating member 10 and the second rotating member 20 can be varied continuously by changing the tilt angle. Note that, in the speed increase ($\gamma<1$) here, the planetary ball 40 on an upper side in FIG. 1 is tilted counterclockwise on the sheet as well as the planetary ball 40 on a lower side is tilted clockwise on the sheet. Further, in the speed reduction ($\gamma>1$), the planetary ball 40 on the upper side in FIG. 1 is tilted clockwise on the sheet as well as the planetary ball 40 on the lower side is tilted counterclockwise on the sheet.

The continuously variable transmission 1 is disposed with a speed change device for changing the transmission ratio $\gamma$. Since the transmission ratio $\gamma$ changes as the tilt angle of the planetary balls 40 changes, a tilt device for tilting the respective planetary balls 40 is used as the speed change device. Here, the speed change device includes a disk-shaped iris plate (tilt element) 80.

The iris plate 80 is attached to the shaft 50 via, for example, a bearing on an inside in the radial direction and can relatively rotate about the first rotation central axis R1 with respect to the shaft 50. An actuator (drive unit) such as a not shown motor and the like is used for the relative rotation. A drive force of the drive unit is transmitted to an outer circumferential portion of the iris plate 80 via a worm gear 81 shown in FIG. 3.

Figure 3:
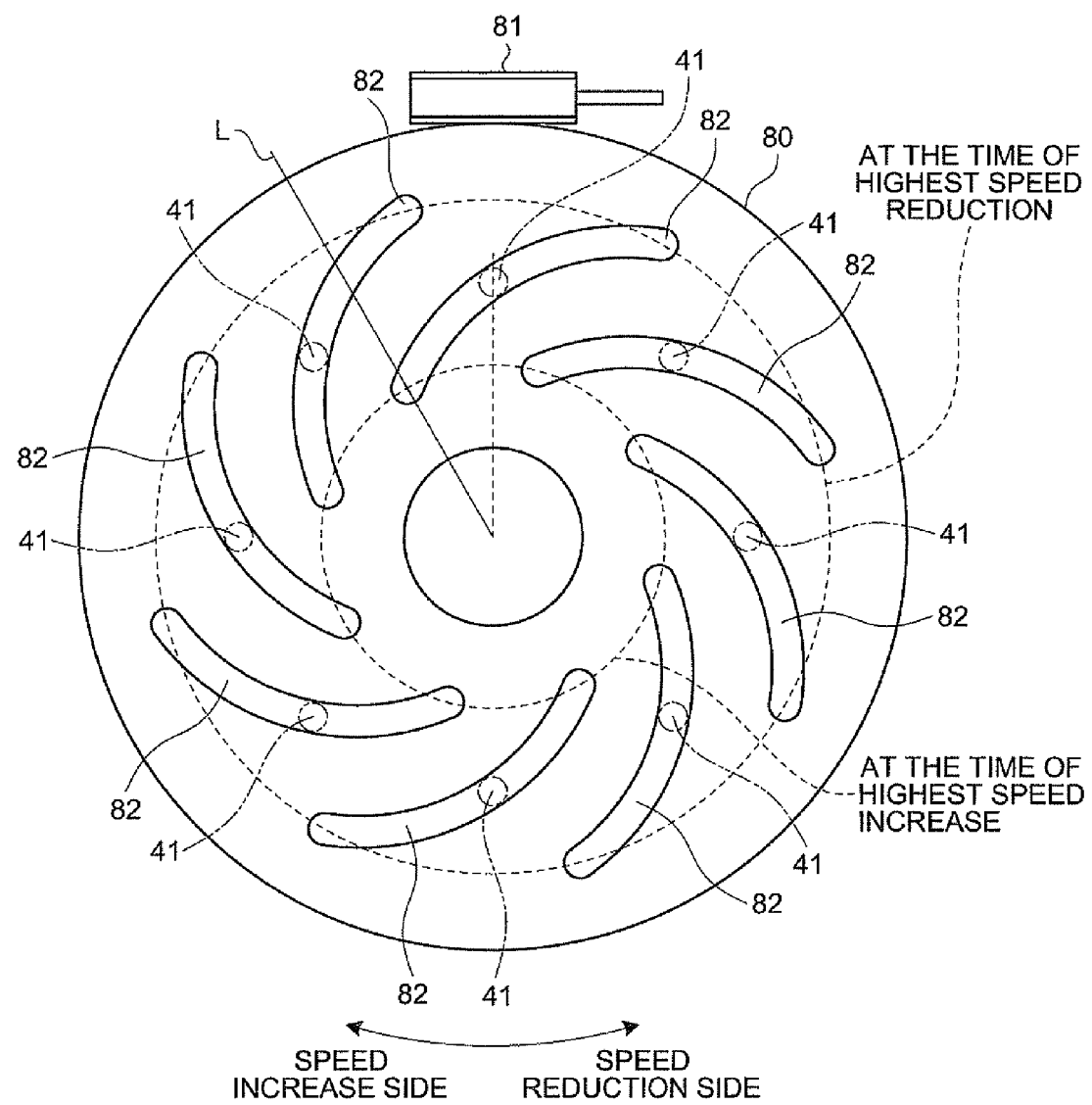
FIG. 3 is a view explaining an iris plate.

The iris plate 80 is disposed on input sides (on contact portion sides with the first rotating member 10) or output sides (contact portion sides with the second rotating member 20) of the respective planetary balls 40 as well as outside or inside of the carrier 60. In the example, the iris plate 80 is disposed on the output side as well as on the inside of the carrier 60, that is, disposed between the sun roller 30 and the respective planetary balls 40 and the second disk section 62. The iris plate 80 is formed with an aperture hole (iris hole) 82 into which the projecting sections of the support shafts 41 on one side are inserted. When it is assumed that a radial direction whose start point is an end inside in the radial direction shows a reference line L, the aperture hole 82 is formed in an arc shape that is away from the reference line L in the circumferential direction as it is directed from inside in the radial direction to outside in the radial direction (FIG. 3). Note that FIG. 3 is a view observed from the direction of the arrow A of FIG. 1.

The projecting sections on the one sides of the support shafts 41 move to a central side of the iris plate 80 along the aperture hole 82 by that the iris plate 80 rotates clockwise on the sheet of FIG. 3. At the time, since the respective projecting sections of the support shafts 41 are inserted into the guide grooves 63, 64 of the carrier 60, the projecting sections on the one sides inserted into the aperture hole 82 move inside in the radial direction. Further, the projecting sections on the one sides move to an outer circumferential side of the iris plate 80 along the aperture hole 82 by that the iris plate 80 rotates counterclockwise on sheet of FIG. 3. At the time, the projecting sections on the one sides move to outside in the radial direction by the actions of the guide grooves 63, 64. As described above, the support shafts 41 can move in the radial direction by the guide grooves 63, 64 and the aperture hole 82. Accordingly, the planetary balls 40 can execute the aforementioned tilt operation.

Incidentally, as described above, the reaction force of the axis force generated by the axis force generating sections 71, 72 acts on the input shaft 11 and the output shaft 21, respectively. Accordingly, in the input shaft 11, there is a possibility that a flexure (tilt) toward the disk section 21b of the output shaft 21 is generated to the disk section 11b using the vicinity of the thrust bearing TB as a fulcrum. Further, in the output shaft 21, there is a possibility that a flexure (tilt) toward the disk section 11b of the input shaft 11 is generated to the disk section 21b using the vicinity of the thrust bearing TB as the fulcrum. Then, the flexures of the disk sections 11b, 21b generate a nip pressure to the annular thrust bearing TB disposed between the disk sections 11b, 21b. Accordingly, in the thrust bearing TB, since a larger degree of flexure of the disk sections 11b, 21b causes respective races to more push rolling members (here, needles and rollers) between the races, there is a possibility that a smooth rolling operation of the rolling members are disturbed thereby and further wearing of the rolling members and the races and the like are progressed. That is, there is a possibility that the flexure of the disk sections 11b, 21b increases a drive loss and deteriorates durability of the thrust bearing TB.

As a means for suppressing the generation of flexure of the disk sections 11b, 21b, it is considered to increase thicknesses $t_{in}$, $t_{out}$ of the respective disk sections 11b, 21b. However, with the configuration, since a body size of the continuously variable transmission 1 in the axial direction is enlarged and a weight thereof is increased, it is difficult to increase the thicknesses $t_{in}$, $t_{out}$ of the disk sections 11b, 21b to a degree by which the flexure is perfectly removed. Accordingly, the thicknesses $t_{in}$, $t_{out}$ of the disk sections 11b, 21b are set under a setting condition in which a flexure becomes within an allowable range while securing strength by integrally considering a degree of suppression of the flexure, a secure of strength (durability), a suppression of increase of a shaft length of the continuously variable transmission 1 and a suppression of weight thereof, and the like. The allowable range of the flexure is, in other words, an allowable range of the drive loss of the thrust bearing TB after the durability is secured. Note that the thicknesses $t_{in}$, $t_{out}$ means a maximum wall thickness of a portion for holding the thrust bearing TB in the disk sections 11b, 21b.

When, for example, the disk section 21b of the output shaft 21 is observed in the radial direction, a distance of the disk section 21b from portions (fulcrums) for holding the thrust bearing TB to a portion (power point) to which the reaction force is applied becomes longer than the disk section 11b of the input shaft 11. Accordingly, when the respective thicknesses $t_{in}$, $t_{out}$ are made uniform, a flexure of the output shaft 21 becomes larger than that of the input shaft 11. Further, since the input shaft 11 is thrust engaged with the rotating shaft 12, there is a low possibility that the input shaft 11 is tilted in its entirety by the reaction force of the axis force. In contrast, since the output shaft 21 is attached to the input shaft 11 via the bearing B2, the output shaft 21 is tilted in its entirety in accordance with a magnitude of play of the bearing B2. Accordingly, since the tilt is also added, the disk section 21b applies a force larger than that of the disk section 11b to the thrust bearing TB. Because of these reasons, when the thickness $t_{out}$ of the disk section 21b of the output shaft 21 is set under the setting condition, a thickness $t_{in}$ of disk section 11b of the input shaft 11 can be made thinner than the thickness $t_{out}$ of the disk section 21b.

Thus, the embodiment, the thickness $t_{in}$ of the disk section 11b is made thinner than the thickness $t_{out}$ of the disk section 21b. With the configuration, the respective disk sections 11b, 21b can suppress the flexure (tilt) within the allowable range while securing the strength. Then, as a result, in the continuously variable transmission 1, since the increase of drive loss of the thrust bearing TB and the deterioration of durability thereof can be suppressed, a fuel consumption and the durability can be improved. Further, in the continuously variable transmission 1, an increase of shaft length and an increase of weight can be also suppressed.

Here, the continuously variable transmission 1 can suppress the increase of drive loss of the thrust bearing TB and the deterioration of durability thereof even if it is configured as described below in addition to or independently of the setting of the thicknesses $t_{in}$, $t_{out}$ of the disk sections 11b, 21b ($t_{in} < t_{out}$).

Unless the disk sections 11b, 21b are made robust by increasing the wall thicknesses, they cannot eventually suppress the flexure perfectly. Further, no matter how the disk section 21b is made to a strong thickness $t_{out}$, the tilt of the disk section 21b cannot be perfectly suppressed due to the play of the bearing B2 between the input shaft 11 and the output shaft 21. Thus, the continuously variable transmission 1 is configured so as to allow a generation of the flexure (tilt) of the disk sections 11b, 21b and be able to suppress the increase of drive loss of the thrust bearing TB and the deterioration of durability thereof even if the flexure (tilt) is generated.

Figure 4:
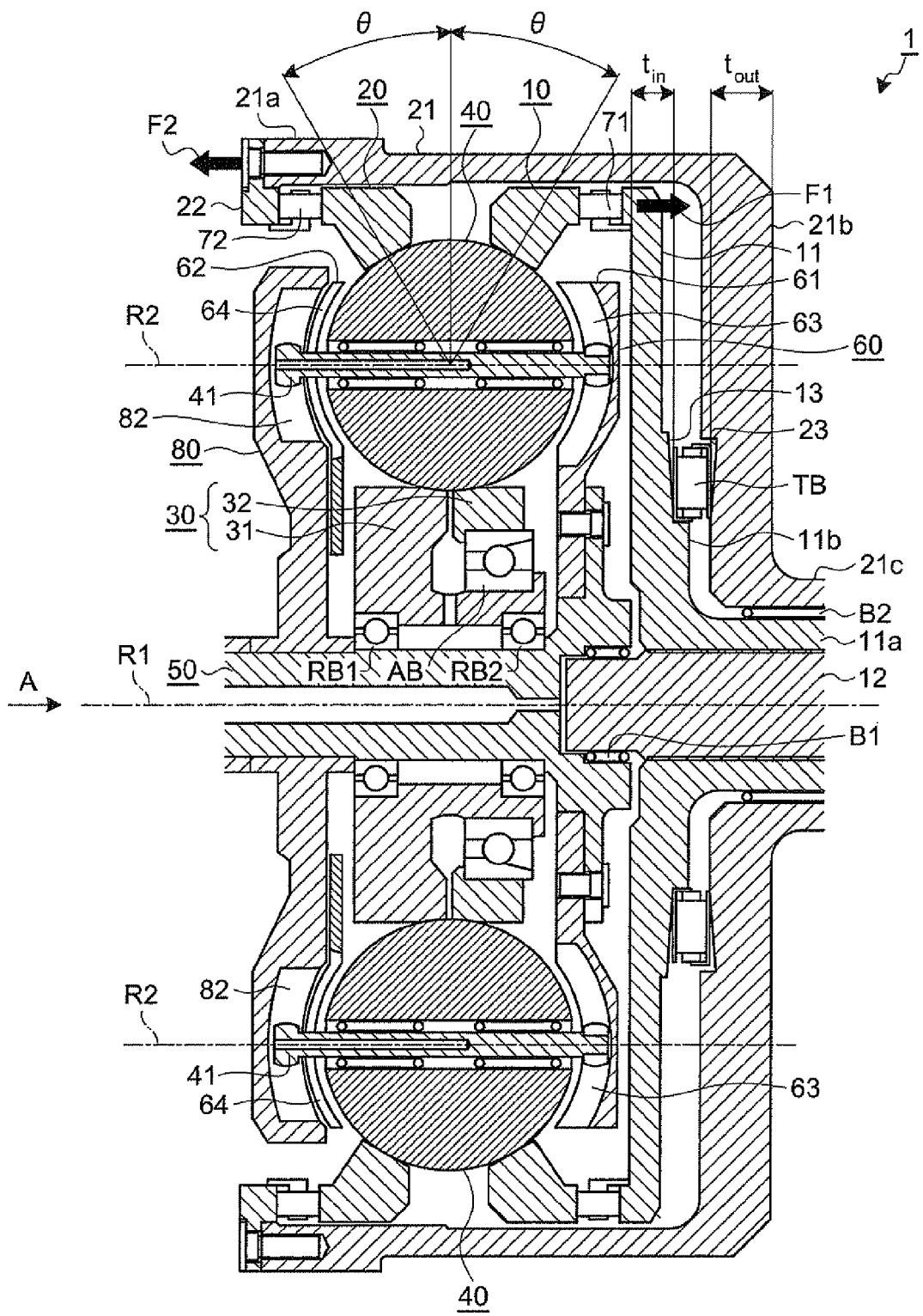
FIG. 4 is a partial sectional view showing a configuration of the embodiment of the continuously variable transmission according to the present invention.

Specifically, as shown in FIG. 4 and an upper view of FIG. 5, the disk sections 11b, 21b are formed with annular holding surfaces 13, 23 for supporting races 91, 92 of the thrust bearing TB. Thus, here, the holding surfaces 13, 23 of the continuously variable transmission 1, when it is at rest, are formed such that spaces between the holding surfaces 13, 23 and the respective races 91, 92 are made wider outside in the radial direction than inside in the radial direction. Specifically, the respective holding surfaces 13, 23 are tilted so that the spaces between the holding surfaces 13, 23 and the races 91, 92 are made wider toward outside in the radial direction. Accordingly, in the state that the continuously variable transmission 1 is at rest, the holding surfaces 13, 23 are formed in such a shape that they hold the thrust bearing TB in line contact with inside portions of the races 91, 92 in the radial direction.

Tilt angles of the holding surfaces 13, 23 mean angles of the holding surfaces 13, 23 with respect to the radial direction when inside portions of the races 91, 92 in the radial direction are used as base points. The tilt angle of the holding surface 13 is set to an angle at which the holding surface 13 is in surface contact with the race 91 in the axial direction when a reaction force acting on the input shaft 11 (that is, a pressure force generated by the axis force generating section 71) is maximized. That is, the tilt angle is an angle at which the holding surface 13 becomes in parallel with the radial direction when a pressure force is maximized by an increase of input torque. Further, likewise, the tilt angle of the holding surface 23 is set to an angle at which the holding surface 23 becomes in parallel with the radial direction and the holding surface 23 is in surface contact with the race 92 in the axial direction when a reaction force acting on the output shaft 21 (that is, a pressure force generated by the axis force generating section 72) is maximized. That is, the continuously variable transmission 1 sets tilt states of the holding surfaces 13, 23 so that tilt angles of the holding surfaces 13, 23 generated by the flexures (tilts) of the disk sections 11b, 21b at the time of the maximum pressure force and the tilt angles of the holding surfaces 13, 23 with respect to the radial direction when the continuously variable transmission 1 is at rest become the same angles.

Figure 6:
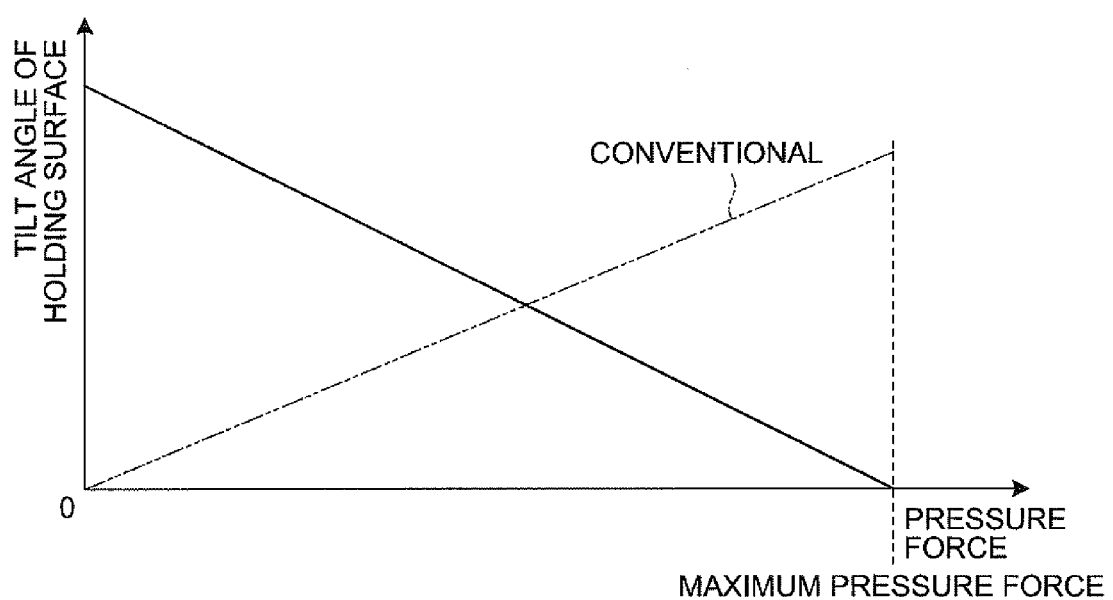
FIG. 6 is a view explaining the relation between a pressure force and a tilt angle of the holding surface.

Here, when a conventional structure is examined, a larger load is gradually applied to the respective races of the thrust bearing TB in accordance with an increase of the pressure force. This is because that the holding surfaces of the disk sections are already abutted to the respective races of the thrust bearing TB in the rest state of the continuously variable transmission 1, the tilt angles of the holding surfaces are increased as the pressure force increases as shown in FIG. 6, and thus the tilt angles of the races due to a play of the thrust bearing TB are also increased. In contrast, since an increase of the pressure force more increases the flexures (tilts) of the disk sections 11b, 21b, the tilt angles of the holding surfaces 13, 23 of the embodiment are gradually reduced in accordance with the increase of the pressure force as shown in the FIG. 6 and become 0° at the maximum pressure force. In FIG. 5, the upper view shows states of the holding surfaces 13, 23 and the thrust bearing TB when the continuously variable transmission 1 is at rest or at the time of a low pressure force, and a lower view shows states of the holding surfaces 13, 23 and the thrust bearing TB at the time of the maximum pressure force.

As described above, according to the continuously variable transmission 1, no excessive load (in particular, a load in the axial direction) is applied to the thrust bearing TB from the holding surfaces 13, 23. Accordingly, in the continuously variable transmission 1, the increase of drive loss of the thrust bearing TB and the deterioration of durability thereof can be suppressed and the fuel consumption and the durability are improved. Further, in the continuously variable transmission 1, since the thicknesses $t_{in}$, $t_{out}$ of the disk sections 11b, 21b can be thinned to the size in which the flexure is allowed, the increase of shaft length and the increase of weight can be also suppressed. Then, in the continuously variable transmission 1, the shaft length can be more shortened and the weight can be more reduced by applying the setting of the thicknesses $t_{in}$, $t_{out}$ of the disk sections 11b, 21b ($t_{in} < t_{out}$).

Incidentally, in the continuously variable transmission 1, the tilt states of the holding surfaces 13, 23 may be set so that the tilt angles of the holding surfaces 13, 23 with respect to the radial direction when the continuously variable transmission 1 is at rest become larger in comparison with the tilt angles of the holding surfaces 13, 23 generated by the flexures (tilts) of the disk sections 11b, 21b at the time of the maximum pressure force. As a result, the holding surfaces 13, 23 are not in surface contact with the respective races 91, 92 of the thrust bearing TB in the axial direction at the time of the maximum pressure force. Even if the continuously variable transmission 1 is configured as described above, since it can suppress the increase of drive loss of the thrust bearing TB and the deterioration of durability thereof, an effect similar to the aforementioned example can be obtained.

MODIFICATION

A modification of the continuously variable transmission 1 of the embodiment will be explained below.

In the continuously variable transmission 1 of the embodiment shown in FIG. 4, the holding surfaces 13, 23 are tilted. Accordingly, when the continuously variable transmission 1 is in the rest state or when the pressure force is low, there is a possibility that the respective races 91, 92 cannot keep a proper attitude in parallel with the radial direction due to the play of the thrust bearing TB and are tilted. Further, at the time, there is also a possibility that the thrust bearing TB is tilted in its entirety with respect to the radial direction. Accordingly, when the pressure force is low, there is a possibility that the drive loss is increased and the durability is deteriorated.

In contrast, in the continuously variable transmission of the first embodiment, as the pressure force is increased, since load points from the holding surfaces 13, 23 also disperse outside in the radial direction, tilt angles of the respective races 91, 92 gradually become small. That is, when the pressure force increases in a state that the respective races 91, 92 tilt, the holding surface 13 (23) pushes and returns the respective races 91, 92 to a proper attitude. Accordingly, in the continuously variable transmission 1, a possibility that an increase of the pressure force increases the drive loss in the thrust bearing TB and deteriorates the durability thereof is reduced.

Figure 7:
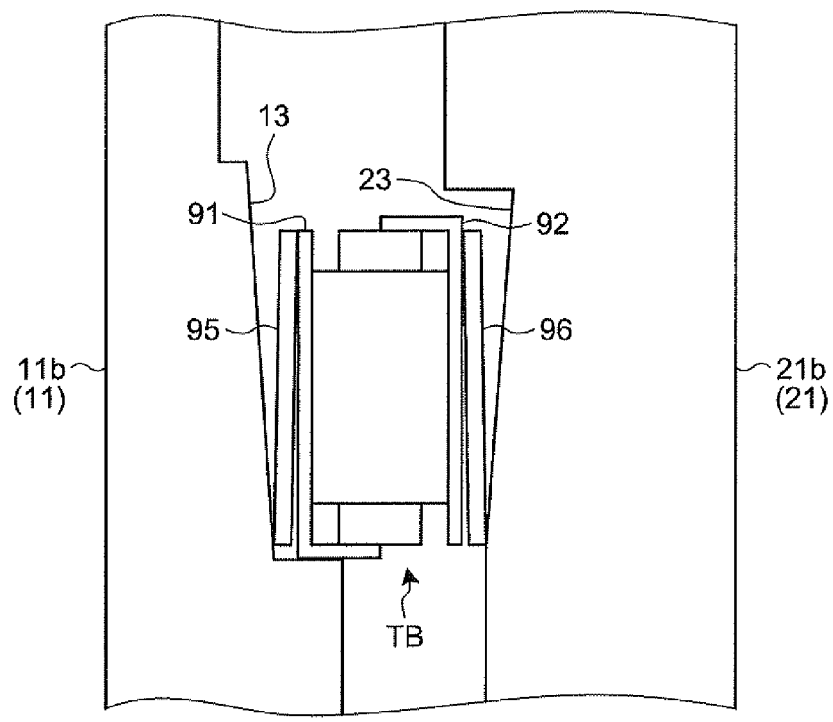
FIG. 7 is a view explaining a holding surface, a thrust bearing, and an elastic member in a modification.
Figure 8:
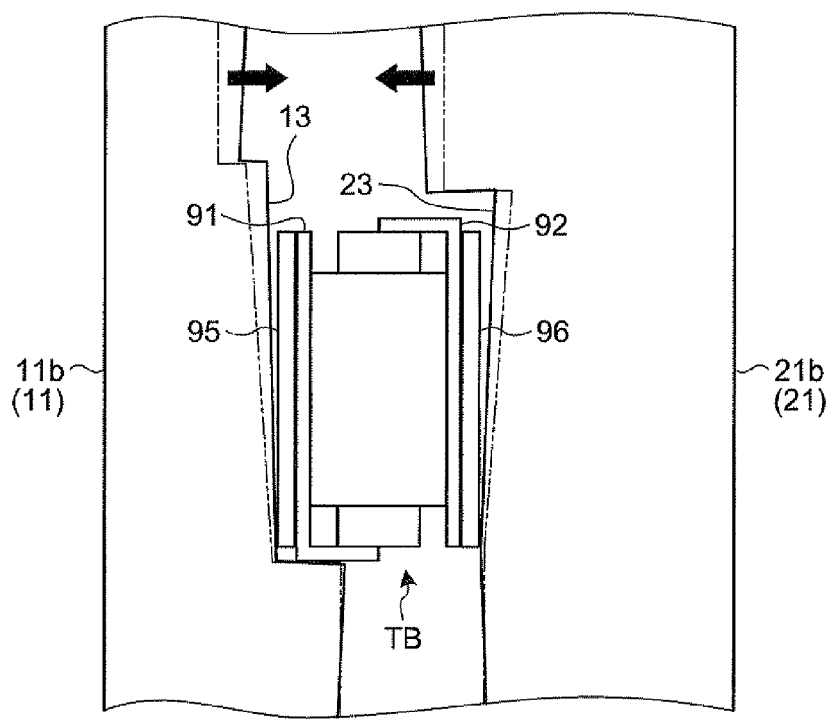
FIG. 8 is a view explaining a thrust bearing and an action of an elastic member to the bearing in the modification.
Figure 9:
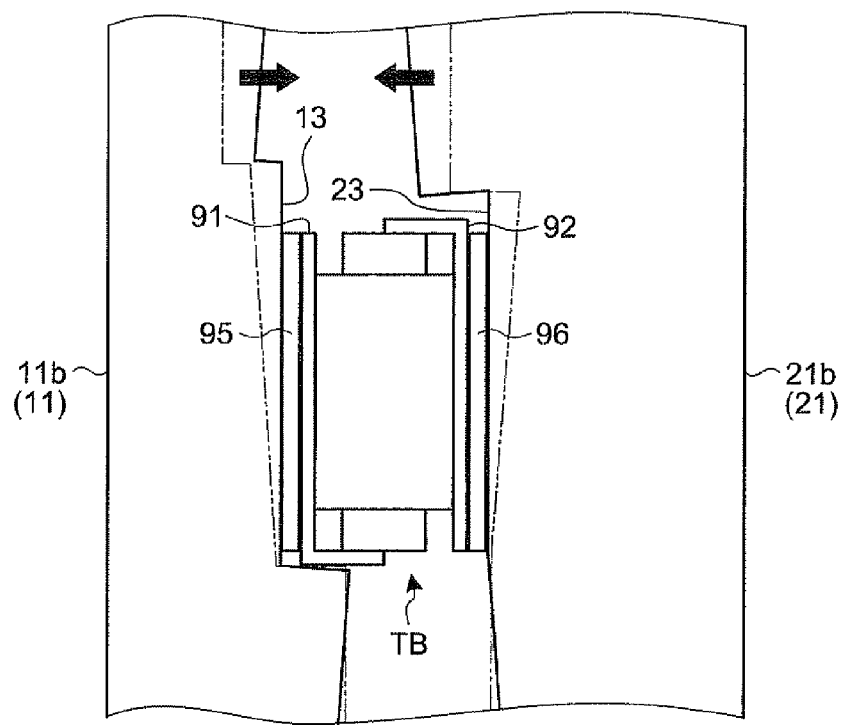
FIG. 9 is a view explaining a thrust bearing and an action of an elastic member to the bearing.

Thus, as shown in FIG. 7, the continuously variable transmission 1 of the modification is configured such that annular elastic members 95, 96 are disposed between the holding surface 13 and the race 91 and between the holding surface 23 and the race 92, respectively and when the continuously variable transmission 1 is in the rest state or when the pressure force is low, the respective races 91, 92 are held in the proper attitude by elastic forces of the elastic members 95, 96.

When the continuously variable transmission 1 is in the rest state or when the pressure force is low, the respective elastic members 95, 96 on the input shaft 11 side and on the output shaft 21 side apply loads on outside portions of the respective races 91, 92 in the radial direction as well as apply loads on inside portions of the respective holding surfaces 13, 23 in the radial direction. A spring such as, for example, a disc spring can be used as the elastic members 95, 96.

In the continuously variable transmission 1 of the modification, when the continuously variable transmission 1 is in the rest state or when the pressure force is low, a nip pressure in the axial direction is generated to the thrust bearing TB by that the elastic members 95, 96 apply loads from outside portions in the radial direction of the respective races 91, 92 having large spaces between them and the holding surfaces 13, 23. Accordingly, when the continuously variable transmission 1 is in the rest state or when the pressure force is low, the continuously variable transmission 1 can suppress the tilt of the respective races 91, 92 and the thrust bearing TB itself and can keep an attitude of the thrust bearing TB properly. Thus, according to the continuously variable transmission 1 of the modification, when the continuously variable transmission 1 is in the rest state or when the pressure force is low, since the increase of drive loss of the thrust bearing TB and the deterioration of durability thereof can be suppressed, the fuel consumption and the durability can be improved.

In contrast, in the continuously variable transmission 1 of the modification, when the pressure force is increased from the time of low pressure, the elastic members 95, 96 are gradually crushed by the holding surfaces 13, 23 and tilt angles of the respective races 91, 92 are increased in the process. However, in the continuously variable transmission 1, since the positional relation between the holding surfaces 13, 23 and the races 91, 92 becomes approximately the same as that of the embodiment described above as shown in FIG. 8 at the time the elastic members 95, 96 are perfectly crushed, thereafter, the tilt angles of the races 91, 92 are reduced until the time of maximum pressure shown in FIG. 9 likewise the embodiment. Thus, according to the continuously variable transmission 1 of the modification, since the increase of drive loss of the thrust bearing TB and the deterioration of durability thereof can be suppressed regardless of a magnitude of the pressure force, the fuel consumption and the durability can be improved.

Incidentally, since an increase of outside diameter of the thrust bearing TB shown in the embodiment and the modification described above more increases a circumferential speed thereof, the drive loss is increased. Thus, in the continuously variable transmissions 1 of the embodiment and the modification, it is preferable to reduce the drive loss by reducing the outside diameter of the thrust bearing TB and more preferably by disposing the thrust bearing TB inside of a center of gravity of each planetary ball 40 in the radial direction. Note that the thrust bearing TB is liable to be affected by the flexure of the holding surfaces 13, 23 as its size is reduced. However, since the continuously variable transmissions 1 of the embodiment and modification are configured to suppress the increase of drive loss of the aforementioned thrust bearing TB and the deterioration of durability thereof by previously providing the holding surfaces 13, 23 with the tilt angle and setting the thicknesses $t_{in}$, $t_{out}$ of the disk sections 11b, 21b to "$t_{in} < t_{out}$", it is possible to reduce the size of the thrust bearing TB while suppressing the increase of shaft length and the increase of weight, and the drive loss of the thrust bearing TB can be more reduced by the reduction of size.

Here, in the continuously variable transmission 1 of the embodiment and the modification, a different bearing, for example, a ball bearing and the like can be also applied in place of the thrust bearing TB. However, in general, as a bearing is reduced in size (in diameter), since the number of rolling members therein is reduced, there is a possibility that the bearing cannot withstand high input torque. Further, when a ball bearing is applied, since steel balls are used as rolling members, since a point contact is made between the rolling members and a race and a surface pressure therebetween becomes high, there is a possibility that a drive loss of the ball bearing is increased. Further, in this type of the continuously variable transmission 1, since traction oil that has a shear stress τ higher than that of so-called ATF, an increase of a surface pressure of the ball bearing more increases the shear stress, and thus there is a possibility that the drive loss of the ball bearing is increased.

Figure 10:
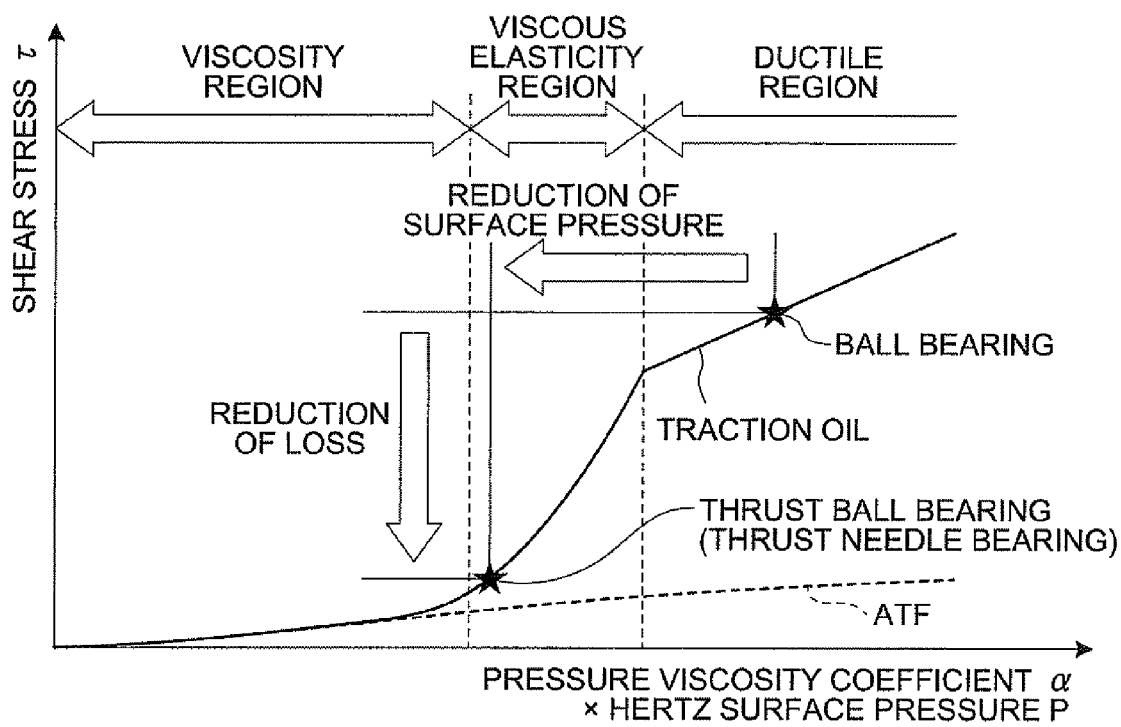
FIG. 10 is a view explaining a drive loss of the thrust bearing and a drive loss of a ball bearing.

From what has been described above, in the continuously variable transmissions 1 of the embodiment and the modification, it is preferable to use the thrust bearing TB after all, and in particular it is preferable to apply a thrust roller bearing and a thrust needle bearing in the thrust bearing. This is because that since the thrust roller bearing and thrust needle bearing can secure the number of rolling members (rollers and needles) even if they are reduced in size in comparison with the ball bearing, they can cope with high input torque. Further, this is because that, in the thrust roller bearing and the thrust needle bearing, since a line contact is made between rolling members and a race, a surface pressure therebetween can be reduced than the ball bearing that employs the point contact, and thus an increase of the drive loss can be suppressed in comparison with the ball (FIG. 10). Note that FIG. 10 is a view explaining a drive loss of a thrust roller bearing and a thrust needle bearing and a drive loss of a ball bearing, wherein a horizontal axis shows a multiplied value of a pressure viscosity coefficient α of traction oil or ATF and a Hertz surface pressure 2, and a vertical axis shows shear stress τ of traction oil or ATF.

Further, in the continuously variable transmissions 1 of the embodiment and the modification described above, since the disk-shaped iris plate 80 is provided as the speed change device (tilt device), the shaft length is increased thereby. Accordingly, the continuously variable transmissions 1 can suppress the increase of the shaft length by providing a function as the speed change device (tilt device) with the carrier. For example, the continuously variable transmission 1 removes the iris plate 80 in the configurations of FIG. 1 and FIG. 4 and replaces the carrier 60 with a carrier 160 shown in FIG. 11.

The carrier 160 has a first disk section 61 formed with guide sections 63 similar to those of the carrier 60 and a second disk section 162 provided with a function as a speed change device (tilt device). In the carrier 160, the first disk section 61 is fixed to the shaft 50 likewise the carrier 60. In contrast, the second disk section 162 can relatively rotate in a circumferential direction with respect to the shaft 50. An actuator (drive unit) such as a not shown motor and the like is used for the relative rotation. The second disk section 162 is formed with guide sections 164 that are offset approximately in parallel with the radial direction and disposed to the respective planetary balls 40. The guide sections 164 are guide grooves or guide holes into which the projecting sections of the support shafts 41 are inserted. When attention is paid to one planetary ball 40 and the one planetary ball 40 is observed from the axial direction (the direction of the arrow A in FIG. 1 and FIG. 4), a guide section 164 is in a tilt state while partly overlapping a guide section 63 in the radial direction in the first disk section 61. The overlapping portion in the guide section 164 with the guide section 63 is also a portion by which the projecting section of a support shaft 41 is held and moves in the radial direction as the second disk section 162 rotates in the circumferential direction. Accordingly, the support shaft 41 and the planetary ball 40 execute a tilt operation as the second disk section 162 rotates. Note that, in the example of FIG. 11, a transmission ratio is changed to a speed increasing side by rotating the second disk section 162 clockwise on the sheet, and the transmission ratio is changed to a speed reducing side by rotating the second disk section 162 counterclockwise on the sheet.

Figure 11:
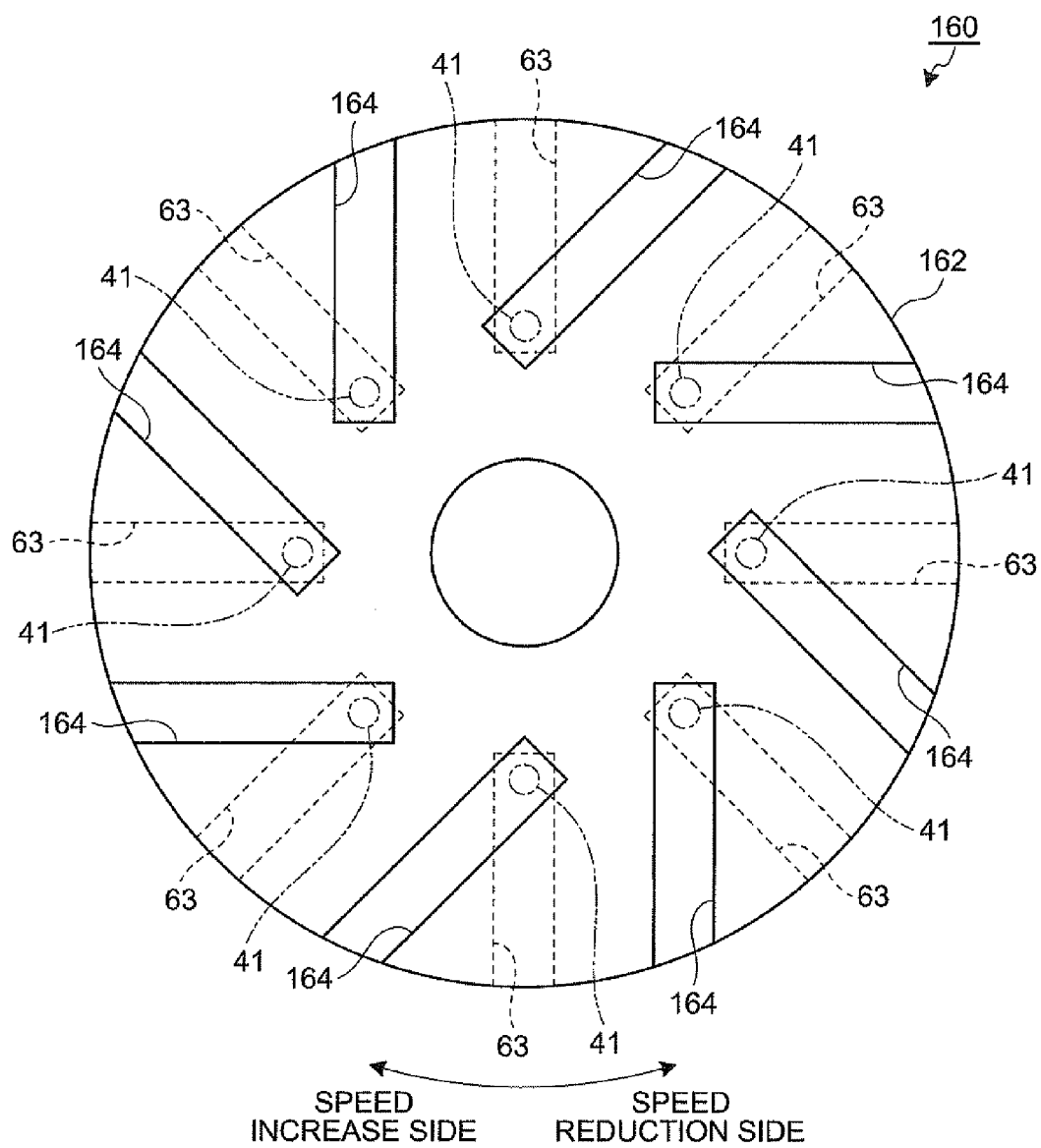
FIG. 11 is a view showing a modification of the carrier.

Further, in the continuously variable transmission 1 having a configuration of FIG. 11, a member that corresponds to the second disk section 62 shown in, for example, FIG. 4 (that is, a member formed with the guide sections 64 in the radial direction) may be additionally provided. At the time, it is sufficient to dispose the member at a position confronting the first disk section 61 in the axial direction across the planetary balls 40 (between the planetary balls 40 and the second disk section 162 or outside of the second disk section 162 in the axial direction (for example, a left side of the sheet in FIG. 4)).

REFERENCE SIGNS LIST

1 CONTINUOUSLY VARIABLE TRANSMISSION
10 FIRST ROTATING MEMBER (FIRST ROTATING ELEMENT)
11 INPUT SHAFT
11b DISK SECTION

13 HOLDING SURFACE
20 SECOND ROTATING MEMBER (SECOND ROTATING ELEMENT)
21 OUTPUT SHAFT
21b DISK SECTION
23 HOLDING SURFACE
30 SUN ROLLER (THIRD ROTATING ELEMENT)
40 PLANETARY BALL (ROLLING MEMBER)
41 SUPPORT SHAFT
50 SHAFT (TRANSMISSION SHAFT)
60, 160 CARRIER (HOLDING MEMBER)
71, 72 AXIS FORCE GENERATING SECTION
80 IRIS PLATE
91, 92 RACE
95, 96 ELASTIC MEMBER
164 GUIDE SECTION
R1 FIRST ROTATION CENTRAL AXIS
R2 SECOND ROTATION CENTRAL AXIS
TB THRUST BEARING

The invention claimed is:

1. A continuously variable transmission comprising:
a transmission shaft disposed at a center of rotation;
a first rotating element and a second rotating element disposed on the transmission shaft in confrontation with each other and are capable of relatively rotating with each other, the first rotating element and the second rotating element having a common first rotation central axis;
a plurality of rolling members having a second rotation central axis in parallel with the first rotation central axis, and are sandwiched between the first rotating element and the second rotating element, the plurality of rolling members being disposed radially about the first rotation central axis;
support shafts projecting from both ends of the plurality of the rolling members and extending along the second rotation central axis;
a holding member tiltably holding the plurality of rolling members with a plurality of projecting sections of the respective support shafts;
a third rotating element having at least one of the plurality of rolling members disposed on an outer circumferential surface, the third rotating element being capable of relatively rotating with respect to the transmission shaft as well as the first and second rotating elements;
a speed change device configured to change a transmission ratio by changing a rotation ratio between the first rotating element and the second rotating element, the rotation ratio being changed by a tilt operation of the respective rolling members;
an input shaft of torque being coupled with the first rotating element, and having a disk section rotating about the first rotation central axis, the input shaft being subjected to a reaction force of a pressure force transmitted from the first rotating element to the respective plurality of rolling members;
an output shaft of torque being coupled with the second rotating element, and having a disk section rotating about the first rotation central axis and arranged opposite to the disk section of the input shaft, the output shaft being subjected to a reaction force of a pressure force transmitted from the second rotating element to the respective plurality of rolling members;
a bearing sandwiched between a holding surface in the disk section of the input shaft and a holding surface in the disk section of the output shaft;
a first elastic member disposed on an input shaft side of the bearing in the radial direction between the holding surface of the input shaft and a race on one side of the bearing, the first elastic member applying a load to an outside portion of the race on one side of the bearing at the time of rest; and
a second elastic member disposed on an output shaft side of the bearing in the radial direction between the holding surface of the output shaft and a race on the other side of the bearing, the second elastic member applying a load to an outside portion of the race on the other side of the bearing at the time of rest, wherein
the holding surface of the input shaft at a time of rest is formed such that a space between the holding surface and the race on one side of the bearing becomes wider on an outside in the radial direction than on an inside in the radial direction, and
the holding surface of the output shaft at the time of rest is formed such that a space between the holding surface and the race on the other side of the bearing becomes wider on the outside in the radial direction than on the inside in the radial direction.

* * * * *